United States Patent Office 2,740,778
Patented Apr. 3, 1956

2,740,778

HETEROCYCLIC COMPOUNDS AND PROCESS OF PRODUCING THEM

Julius Diamond, Philadelphia, and William F. Bruce, Havertown, Pa., assignors to American Home Products Corporation, New York, N. Y., a corporation of Delaware No Drawing. Application December 23, 1953, Serial No. 400,136

7 Claims. (Cl. 260—239)

This invention relates to heterocyclic compounds and more particularly involves azacycloalkanes and the method for preparing them.

Basic compounds falling within the scope of the invention may be represented by the general formula

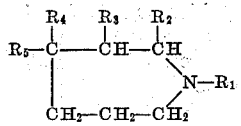

$R_1$ in the formula standing for a lower alkyl radical, $R_2$ and $R_3$ each representing either hydrogen or lower alkyl, $R_4$ standing for hydrogen, —$CONH_2$, —$COOH$ or —$COO$-alkali-metal, with $R_5$ representing an aryl radical, specifically a substituted or unsubstituted phenyl or a naphthyl or benzhydryl radical. Preferred substituents on a ring, which may be in any position and ranging from one to three, are lower alkyl, lower alkoxy, halogen, nitro, hydroxy, aliphatic acyl and acyloxy, amino and mono- and di-lower alkyl-substituted amino radicals. Where salts or quaternary ammonium compounds are formed, the above formula is modified as follows:

with R standing for an alkyl radical or hydrogen and A representing an anion.

These compounds are capable of forming acid-addition salts with organic or inorganic acids most of which are of solid or crystalline nature. In addition, the free bases may be reacted with alkyl halides on an equimolar basis, forming quaternary ammonium compounds. The compounds have been found useful either for the preparation of surface active agents or as therapeutic agents demonstrating an analgesic action.

In the preparation of any of the above-described bases, one may start with the corresponding 4-cyano compound disclosed and claimed in a prior co-pending application, Serial No. 297,185 filed July 3, 1952, now Patent No. 2,666,050. By one procedure, a 4-aryl-4-cyano-azacycloheptane is heated with an alkali-metal amide such as sodium, potassium or lithium amide in the presence of an inert organic solvent of the aliphatic type such as hexane or higher, or of the benzenoid type such as benzene, toluene or xylene. The reaction will take place in the range of about 50° to about 150° C. A preferable temperature range of operation is in the neighborhood of 90° to 110° C.

Another procedure for preparing the azacycloheptanes involves hydrolyzing the corresponding cyano compound to form the 4-amido-azacycloheptane, and then reacting the latter compound with an alkali metal hydroxide which forms first the carboxylic acid salt of the alkali metal followed by a decarboxylation to the desired compound. This stepwise procedure is carried out first at about 190° C. for the formation of the amide, with the temperature being raised in the neighborhood of about 250° C. for the final steps. If only the final product is sought, with no desire to separate out intermediate compounds, the reaction may be carried out by merely heating the cyano compound with the hydroxide and water between about 200° to 300° C.

The amide in relatively pure form may be prepared by reacting the 4-cyano base with a higher alcohol and base, such as KOH at a temperature in the neighborhood of 160° C. Such alcohols as heptanol or octanol are suitable for the reaction. Of course lower alcohols such as methyl alcohol may be used if one operates under pressure.

In order to obtain carboxylic compounds, the above procedure may be followed but operating at a temperature above 160° C., namely, in the neighborhood of 200° C.

The specific examples illustrate in greater detail methods for obtaining typical compounds of the invention.

Example 1

A mixture of 0.05 mole (10.7 g.) 4-cyano-1-methyl-4-phenylazacycloheptane and 0.11 mole (4.3 g.) sodamide in 100 ml. of toluene was refluxed while stirring for 6 hours. The cooled mixture was washed with water, then the toluene layer extracted with acid, the acid extract washed with ether, treated with sodium hydroxide and the reaction product extracted with ether. The ether extract was dried, filtered, and distilled. The product, 1-methyl-4-phenyl-azacycloheptane was collected at 88–90° C. (0.25 mm.); $n_D^{29}$ 1.5288. Analysis.—Calcd. for $C_{13}H_{19}N$: C, 82.47; H, 10.12; N, 7.40. Found: C, 82.20; H, 10.41; N, 7.51.

The picrate, M. P. 149–150° C., was prepared in methanol. Analysis.—Calcd. for $C_{19}H_{22}N_4O_7$: C, 54.55; H, 5.30; N, 13.38. Found: C, 54.52; H, 5.03; N, 13.20.

0.1 mole (3.6 g.) of hydrogen chloride gas was passed into 50 ml. of a cold 1:1 ether-acetone solution containing 0.1 mole (18.9 g.) of the base. The precipitated hydrochloride was filtered off and washed with ether. It could be further purified by recrystallization from methyl ethyl ketone to give a fine white solid, M. P. 78–79° C.

0.1 mole (14.2 g.) of methyl iodide was added slowly to a cold acetone solution containing 0.1 mole (18.9 g.) of the base. The mixture was kept at 25° for 3 hours, then the precipitated white solid filtered off and washed with acetone; M. P. 146–147° C. of 1-methyl-4-phenyl-azacycloheptane methiodide.

0.1 mole (17.0 g.) of isopropyl iodide was added to an ether solution containing 0.1 mole (18.9 g.) of the base and the mixture allowed to stand at room temperature for 2 days. The precipitated yellowish solid was filtered and washed with ether; M. P. 166–169° C. of 1-methyl-4-phenyl-azacycloheptane isopropiodide.

It is obvious that other salts as well as quaternary ammonium compounds may be prepared by following the above procedures. Thus, besides the salts mentioned, one may prepare the corresponding salts by reacting the free base with hydrogen bromide, sulfuric acid, nitric acid, phosphoric acid or other inorganic acids as well as the lower aliphatic acids such as acetic acid, propionic acid, lactic acid, etc. With regard to other quaternary salts, various alkyl halides may be used of the lower and higher type such as lauryl bromide or chloride where a long-chain alkyl group is desired on the base moiety.

Example 2

In the same manner as taught in Example 1, and starting with 0.05 mole (11.4 g.) of 4-cyano-1,2-dimethyl-4-phenylazacycloheptane, one may obtain the free base 1,2-dimethyl-4-phenylazacycloheptane, B. P. 106–108° C. (0.2 mm.), $n_D^{27}$ 1.5255. Analysis.—Calcd. for $C_{14}H_{21}N$:

C, 82.65; H, 10.40; N, 6.88. Found: C, 82.25; H, 10.35; N, 6.66.

The picrate, M. P. 128–130° C., was prepared in methanol-ether. *Analysis.*—Calcd. for $C_{20}H_{24}N_4O_7$: C, 55.60; H, 5.59; N, 12.95. Found: C, 55.35; H, 5.58; N, 12.70.

*Example 3*

Following the procedure of Example 1, and starting with 0.05 mole (11.4 g.) 4-cyano-1,3-dimethyl-4-phenyl-azacycloheptane, the product obtained is 1,3-dimethyl-4-phenylazacycloheptane, B. P. 98–100° C. (0.25 mm.), $n_D^{31}$ 1.5251. *Analysis.*—Calcd. for $C_{14}H_{21}N$: C, 82.65; H, 10.40; N, 6.88. Found: C, 82.06; H, 10.35; N, 6.60.

The methiodide, M. P. 184–190° C., was prepared in acetone. *Analysis.*—Calcd. for $C_{15}H_{24}NI$: C, 52.20; H, 7.00; N, 4.06; I, 36.75. Found: C, 51.86; H, 7.14; N, 3.72; I, 36.4.

*Example 4*

A mixture of 0.03 mole (6.4 g.) 4-cyano-1-methyl-4-phenylazacycloheptane, 0.12 mole (6.8 g.) potassium hydroxide, and 0.06 mole (1.1 g.) water was heated in an air bath at 200–300° C. under partial vacuum (ca. 200 mm.) for 45 minutes. The crude product was distilled directly from the mixture at 15–20 mm. On redistillation, 1-methyl-4-phenylazacycloheptane was obtained, B. P. 92–94° C. (0.3 mm.), $n_D^{24}$ 1.5301. The picrate, M. P. 148–149° C., was prepared in methanol and recrystallized from aqueous acetic acid. No depression in melting point was observed on admixing with the picrate of the product obtained by Example 1.

*Example 5*

A mixture of 0.715 mole (153 g.) of 4-cyano-4-phenyl-1-methyl-azacycloheptane, 1.43 mole (25.7 g.) of water, and 2.86 mole (160 g.) of potassium hydroxide was heated in an air-bath while continuously stirring under 300 mm. pressure. A maximum temperature of 207° C. was reached after 30 minutes and then the temperature was maintained at 195–205° C. for an additional 30 minutes. An upper oil layer was present. The mixture was cooled to room temperature whereupon the oily layer solidified. It was filtered and the solid (A) washed several times with cold water; M. P. 80–85° C.

The filtrate from (A) was extracted with ether, the extract dried, filtered, and concentrated. Trituration of the liquid residue with n-hexane precipitated solid (B); M. P. 89–91° C.

(A) and (B) were combined, ground under n-hexane containing some benzene, then filtered to give an almost white solid (C) of 4-carbamyl-4-phenyl-1-methylazacycloheptane monohydrate, M. P. 90–92° C. This material did not depress the melting point of an authentic sample of the amide monohydrate prepared by the method of Example 6.

The combined n-hexane filtrates obtained from (B) and (C) were concentrated and the liquid residue distilled. At 90–95° C. (0.3 mm.) 22.5 g. (16.7%) of 4-phenyl-1-methylazacycloheptane was obtained, $n_D^{26.5}$ 1.5300, as by-product.

*Example 6*

A mixture of 0.030 mole (6.4 g.) of 4-cyano-4-phenyl-1-methyl-azacycloheptane was dissolved in 75 ml. of heptanol-2 containing 0.035 mole (2.0 g.) of potassium hydroxide. The solution was heated to its reflux temperature (157–160° C.) with stirring for 2 hours. The cold mixture was extracted with acid, the acid extract washed with ether, reacted with sodium hydroxide, and ether extracted. The ether extract was dried, filtered, and concentrated. A liquid residue was obtained which began to crystallize after standing overnight. Trituration with n-hexane hastened the crystallization. The white crystals were filtered off and washed with n-hexane to give 4-carbamyl-4-phenyl-1-methyl-azacycloheptane monohydrate, M. P. 95–96° C. *Analysis.*—Calcd. for $C_{14}H_{20}N_2O \cdot H_2O$: C, 67.15; H, 8.86; N, 11.20. Found: C, 67.11; H, 8.87; N, 10.76.

*Example 7*

Dissolve .03 mole of cyano base in .06 mole of KOH in about 100 ml. methanol. The material is heated in the neighborhood of 200° C. under pressure. The mixture is cooled and reacted with .03 mole of concentrated sulfuric acid. Potassium sulfate precipitates and is filtered off. To the filtrate is added .015 mole of sulfuric acid and the solution is concentrated to a small volume. It is then diluted with acetone and the sulfate salt of 4-carboxy-4-phenyl-1-methylazacycloheptane crystallizes out; M. P. 250–251° C. (with decomp.). *Analysis.*—Calcd. for $C_{14}H_{19}NO_2 \cdot \tfrac{1}{2}H_2SO_4$: C, 59.52; H, 7.14; N, 4.96; S, 5.68. Found: C, 59.27; H, 7.30; N, 5.00; S, 5.30.

The above-described compounds are useful for the preparation of other cyclic compounds having special functional groups in the 4-position besides the aryl group. Thus, these compounds, and particularly the compound prepared as described in Example 3, when reacted with lead tetra-acetate or higher aliphatic acid salt at about 100° C. in the presence of acetic acid or higher corresponding carboxylic acid will result in the addition of an acyloxy radical in the 4-position of the ring. Compounds of this type have also been found to demonstrate an analgesic action besides having usefulness in the manner described previously.

We claim:

1. The process comprising decyanating a compound having the formula $$\begin{array}{c} \text{CN} \quad R_3 \quad R_2 \\ | \quad\quad | \quad\quad | \\ C_6H_5-C-\!\!-\!\!-CH-CH \\ | \quad\quad\quad\quad\quad\quad \searrow \\ | \quad\quad\quad\quad\quad\quad\quad N-R_1 \\ CH_2-CH_2-CH_2 \nearrow \end{array}$$

wherein $R_1$ stands for a lower alkyl while $R_2$ and $R_3$ each represent a member of the group consisting of hydrogen and lower alkyl by heating said compound with an alkali metal amide, said heating being carried out in a hydrocarbon medium in the substantial absence of water and at a temperature in the range of about 50° to about 150° C.

2. A compound of the group consisting of an azacycloheptane base having the general formula $$\begin{array}{c} R_3 \quad R_2 \\ | \quad\quad | \\ C_6H_5-CH-CH-CH \\ | \quad\quad\quad\quad\quad \searrow \\ | \quad\quad\quad\quad\quad\quad N-R_1 \\ CH_2-CH_2-CH_2 \nearrow \end{array}$$

wherein $R_1$ stands for a lower alkyl while $R_2$ and $R_3$ each represent a member of the group consisting of hydrogen and lower alkyl and salts thereof.

3. The compound 4-phenyl-1-methyl-azacycloheptane.

4. The compound 1,2-di-lower alkyl-4-phenyl-azacycloheptane.

5. The compound 1,3-di-lower alkyl-4-phenyl-azacycloheptane.

6. The compound 1,2-dimethyl-4-phenyl-azacycloheptane.

7. The compound 1,3-dimethyl-4-phenyl-azacycloheptane.

References Cited in the file of this patent

UNITED STATES PATENTS 2,666,050     Diamond et al.            Jan. 12, 1954

OTHER REFERENCES

Gabriel: Chem. Abst., vol. 3, p. 2138 (1909).
Karrer: "Org. Chem." (Elsevier), p. 178 (1946).